United States Patent [19]

Sawada

[11] 3,791,269
[45] Feb. 12, 1974

[54] DEVICE FOR DELIVERING SHEETS
[75] Inventor: Tetsuya Sawada, Kyoto, Japan
[73] Assignee: Rengo Kabushiki Kaisha (Rengo Co., Ltd.), Osaka, Japan
[22] Filed: June 1, 1972
[21] Appl. No.: 258,784

[52] U.S. Cl.............. 93/93 DP, 93/93 C, 271/46, 271/183, 271/202
[51] Int. Cl............................................. B65h 29/66
[58] Field of Search...... 271/46, 76, DIG. 8, 74, 75, 271/47, 32; 93/93 C, 93 DP

[56] References Cited
UNITED STATES PATENTS
| 2,919,789 | 1/1960 | Coakley | 271/46 X |
| 3,252,702 | 5/1966 | Halbert | 271/32 |
| 2,240,423 | 4/1941 | Spiess | 271/46 X |
| 3,336,028 | 8/1967 | Schonmeier | 271/46 X |
| 3,149,834 | 9/1964 | Faeber | 271/47 |

Primary Examiner—Evon C. Blunk
Assistant Examiner—Bruce H. Stone, Jr.
Attorney, Agent, or Firm—Wenderoth, Lind & Ponack

[57] ABSTRACT

A device for forming a space between groups of a predetermined number of overlapped sheets moving successively in a line. The device has a first conveyor for conveying sheets of a fixed length which are cut from a band sheet. A second conveyor is provided just beyond the delivery end of the first conveyor for receiving sheets from the first conveyor in overlapping relationship. A suction means is provided adjacent said second conveyor for temporarily holding a sheet on the second conveyor by suction. The second conveyor is movable in such a way that the upper run thereof is movable up and down above and below the level of the suction means. The second conveyor is normally above the suction means, but when a predetermined number of sheets has been delivered to the second conveyor, the second conveyor is lowered, and one of the sheets delivered thereto is held by suction from the suction means to delay its movement along the second conveyor momentarily, after which the second conveyor is again raised to release the delayed sheet from the suction means.

1 Claim, 5 Drawing Figures

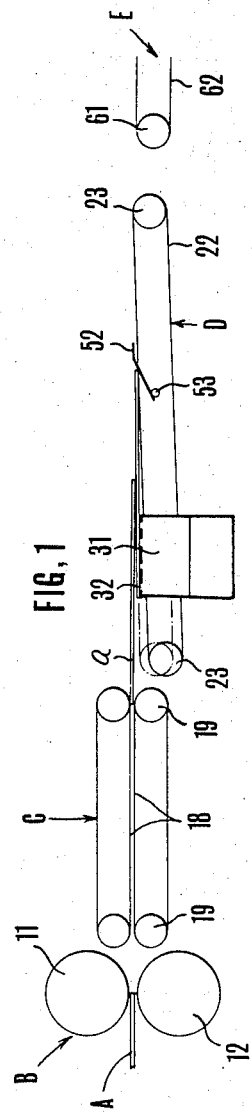
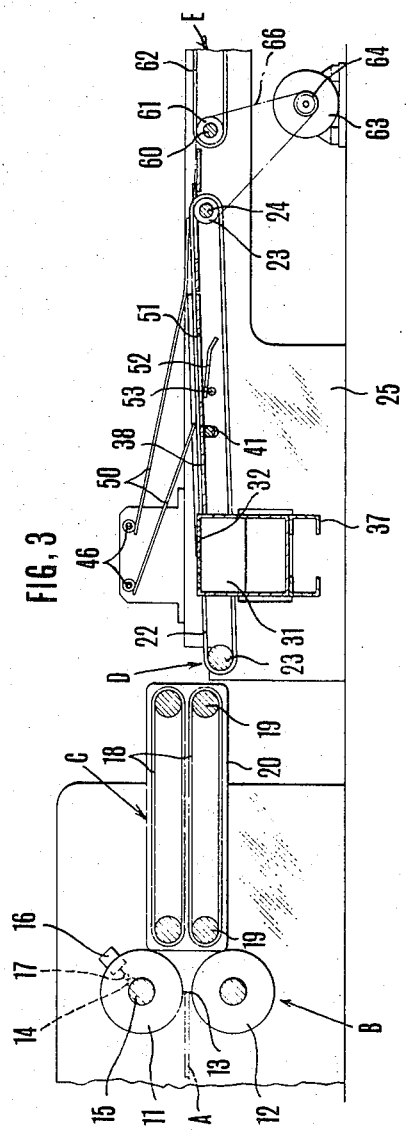

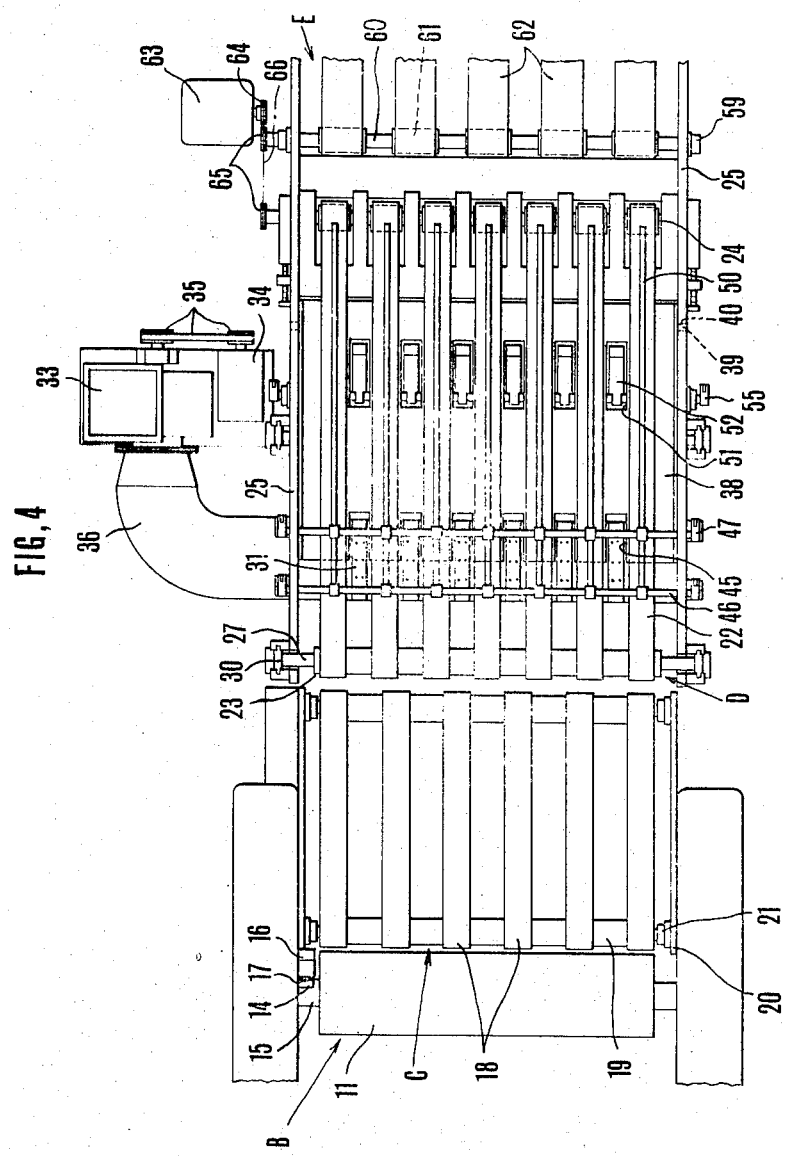

DEVICE FOR DELIVERING SHEETS

The present invention relates to a conveyor device which creates a space in an overlapping stream of sheets on a delivery conveyor.

In a conventional method of producing a batch of cut sheets, a band sheet is cut into sheets of a fixed length by a cutting machine and they are carried to a belt conveyor through a sandwich conveyor. Since the speed of the sandwich conveyor is adapted to be slightly faster than the feeding speed of the band sheet, a space is created between the back end of the cut sheets and the front end of the band sheet. In other words, a space is left between successive sheets. The belt conveyor is operated at about half the feeding speed of the band sheet. Thus the cut sheets are carried on the belt conveyor in an overlapping relationship.

Furthermore, a gate is provided on the carrying face of the conveyor at the end thereof. The gate is adapted to close when the number of cut sheets is detected to be equal to a predetermined number by means of a detecting means, and the closed gate contacts the front edge of the following sheet and accumulates the sheets in piles on the belt conveyor for a fixed period until the gate again opens. When the gate is opened the conveyor carries the next batch of cut sheets and this operation is repeated. Thus some of the cut sheets carried by the belt conveyor in overlapped state are held back by the gate to make a space between the preceeding sheet and thus produce a batch of sheets consisting of the prescribed number.

However, in closing the gate after detecting that the prescribed number of sheets have passed through, the closed gate abutting the carrying belt produces resistance to the movement of the conveyor belt, and causes slipping between the belts of the conveyor and the driving pulleys, and the position of the front end of the gate relative to the front end of the sheet changes, depending on the cutting length of the sheet and the carrying speed. Accordingly, a batch of sheets released by the gate is not always uniform in number, and thus this system has the disadvantage that a batch may have more or less than the prescribed number of sheets in a batch.

An object of the present invention is to provide a device for temporarily halting sheets on a carrying run by providing a suction box on the under side of the carrier belt of a conveyor which positively retains a sheet passing thereover by suction to make batches of any prescribed number of sheets from a flow of successively overlapping sheets carried by the conveyor.

This and other objects are accomplished by the parts, improvements, combinations and arrangements comprising the invention, a preferred embodiment of which is shown by way of example in the accompanying drawings, and hereinafter described in detail.

FIG. 1 is a schematic side view of a carrying apparatus.

FIG. 3 is a longitudinal sectional side view thereof.

FIG. 4 is a plane view showing a part of the suction apparatus.

Figure 2:
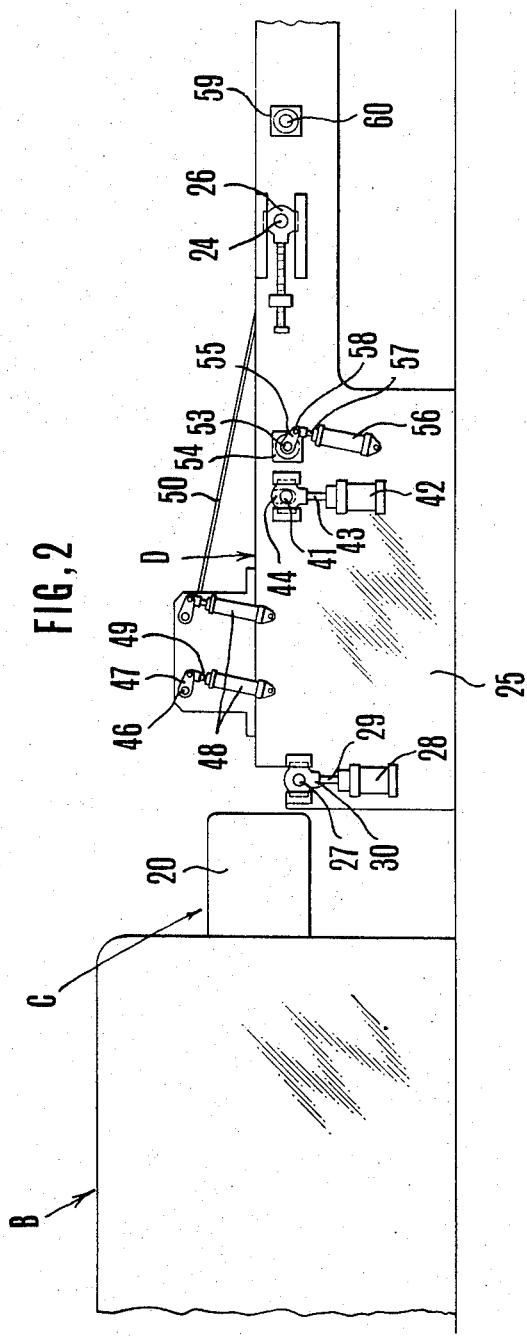
FIG. 2 is a side view showing the essential parts thereof.
Figure 5:
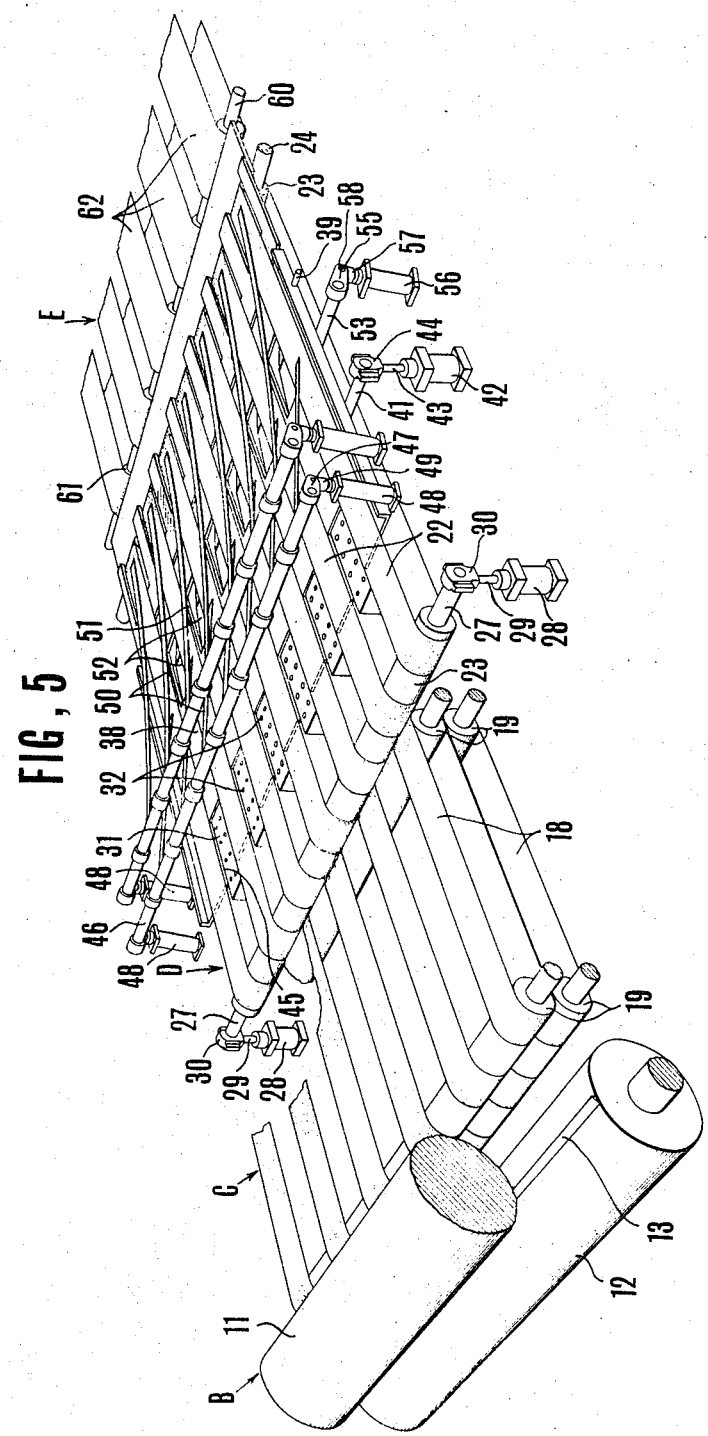
FIG. 5 is a partially sectioned perspective view thereof.

Referring now to FIGS. 1 to 5, a cutting means B which cuts a band sheet or web A into sheets $a$ of fixed length comprises a pair of upper and lower rolls 11, 12 which are driven at equal speeds in counterclockwise and clockwise directions respectively, and a cutting edge 13 axially provided on the periphery of lower roll 12. A projecting member 14 is provided on the periphery of the projecting shaft of the upper roll 11. An actuator 17 of a counter 16 is adapted to contact the projecting member 14 once per revolution of the upper roll 11 actuating the counter to count cut sheets.

A sandwich conveyor C is located in front of the cutting means B, and a plurality of parallel endless belts 18, whose ends are respectively supported by means of front and rear pulleys 19, are provided opposite the cutting means so that the carrying faces of the belts 18 may deliver the sheets $a$ forwards, the speed of the sandwich conveyor C being faster than the feeding speed of the band sheet A. Side plates are disposed on both sides of the sandwich conveyor C, and support the end of the pulleys 19 by means of the bearings 21.

A delivery conveyor D is located in front of the sandwich conveyor C and both ends of each of a plurality of parallel endless belts 22 are supported by pulleys 23. A shaft 24 of the pulley 23, is located at the rear of the conveyor D and is supported by bearings 26 on side plates 25. A shaft 27 projects from the center of both ends of the pulley 23 and is supported by means of bearings 30 mounted on the upper ends of piston rods 29 which are driven by cylinders 28. Thus, the front of the delivering conveyor D can be moved up and down. The delivering conveyor D is operated at a speed approximately half the feeding speed of the band sheet A. Accordingly, the sheets $a$ on the conveying runs of the delivering conveyor D overlap. Suction boxes 31 are positioned between each belt 22 in parallel with each other at the front portion of the delivering conveyor D, the top wall of each suction box 31 being provided with numerous small holes 32. The travelling faces of the belts 22 are adapted to be located slightly above the top walls of the suction boxes 31 when the piston rods 29 are in an extended position while the top walls of the suction boxes 31 project slightly above the travelling faces of the belts 22 when the piston rods 29 are in a retracted position. Also, the cylinders 28 are adapted to be operated by at least two kinds of signals from the counter 16, as explained below. An exhaust blower 33 is operated by means of a transmission mechanism 35 of a motor 34, a suction port of the exhaust blower 33 communicating with the suction boxes 31 through a duct 36.

The suction boxes 31 are secured to a supporting member 37 extending between the side plates 25. A supporting plate 38 supports the conveying runs of the belts 22, and an end of the supporting plate 38 is pivoted in holes 40 in the side plates 25 by pins 39 fixed on both sides of the supporting plate 38. A shaft member 41 is fixed transversely to the underside of the rear end portion of the supporting plate 38. Each end of the shaft member 41 is supported by bearings 44 mounted on the upper terminal of a piston rod 43 of a cylinder 42 which is adapted to be operated synchronously with the cylinder 28. Notches 45 are provided in the rear edge of the supporting plate 38 to allow the suction box to project thereabove. Front and rear shafts 46 transverse the belts 22 above the suction boxes 31, the ends of the shaft 46 being mounted rotatably on the side plates 25. One end of member 47 is secured to the end of the shaft 46 and the other end thereof is pivoted on upper terminal of the piston rod 49 of cylinder 48, whereby the shafts 46 can be rotated by means of the cylinder 48. Numeral 50 denotes a leaf spring, one end of which is fixed to the shaft 46 and the other ends contacting the conveying runs of the belts 22. The leaf springs prevent the sheets *a* running on the belts 22 from floating. The pressure of the leaf spring 50 on the sheets is adjustable by the rotation of the shafts 46 accompanied by the clockwise and counter-clockwise movement of the member 47 by the operation of the piston rod 49 of the cylinder 48.

Openings 51 are provided in the supporting plate 38 in the middle portion thereof between the belts 22. Tongues 52 are located on the underside of each opening 51 and one end of each tongue 52 is secured to the shaft 53 crossing underneath the conveying run of the belts 22. The ends of the shaft 53 are rotatably supported by bearings 54 fixed to the side plates 25. Numeral 55 is a link, one end of which is fixed to the shaft 53 and the other end of which is pivoted on the upper terminal of a piston rod 57 of cylinder 56 through a pin 58. Accordingly, the other ends of the tongues 52 are adapted to project from the openings 51 by rotation of the shaft 53 accompanied by the extending of the piston rod 57, and the action of the cylinder 56 and the cylinder 28 are oppositely synchronized, such that when the piston rod 57 is extended, the piston rod 29 is retracted.

A carrying conveyor E is installed in front of the conveyor D. Endless belts 62 are entrained in parallel between pulleys 61 (only one of which is shown) of a shaft 60 whose ends are supported respectively by means of bearings 59 in the side plates 25. A motor 63 drives the conveyor D and the conveyor E, a chain 66 being entrained between a sprocket 64 of the motor 63 and the sprocket 65 of the shafts 24 and 60.

In the device of the present invention as described hereinbefore, the web A which is fed towards the cutting means B is cut into sheets *a* of fixed size by means of the cutting edge 13 when passing between the rolls 11 and 12 of the cutting means B. The cut sheets *a* are carried forwards while being held between the belts 18 of the conveyor C located in front of the cutting means. At this time, the number of sheets which have passed through is detected by a counter 16 actuated by the actuator 17 which is adapted to contact the projecting member 14 once per revolution of the roll 11 of the cutting means B.

As the sandwich conveyor C moves faster than the delivering speed of the web A, a space is left between the last of the cut sheets *a* and the front end of the band web A. Therefore, a space is left between each sheet *a*.

The sheets *a* are then transfered to the front conveyor D from the sandwich conveyor C and since the delivering conveyor D is operated at approximately half the speed of the sandwich conveyor C, the sheets *a* on the belts 22 of the conveyor D are caused to overlap.

The counter 16 is adapted to generate at least two kinds of signals. When the counter 16 detects a predetermined number of sheets during the cutting operation, the first signal is generated to actuate the cylinder 28 to retract the piston rod 29 and at the same time to reset the counter. After an interval the second signal is generated to actuate cylinder 28 to extend the piston rod 29.

In operation the number of the sheets cut reaches a predetermined number and the counter detects this occurrence and the first signal is generated. The piston rod 29 is retracted by the action of the cylinder 28 and the rear ends of the travelling faces of the belts 22 of the conveyor D are lowered. Accordingly, the top walls of the suction boxes 31 are caused to project above the conveyint faces of the belts 22. Thus the sheet *a* passing on the top wall of each suction box 31 is sucked and halted thereon and the preceeding sheet *a* continues towards the conveyor E, while the sheets following the sucked sheet are accumulated thereon and are temporarily held on the suction box. Also, as the piston rod 43 of the cylinder 42, which is operated synchronously with the cylinder 28, is retracted the end of the supporting plate 38 is lowered to receive the slack of the belts 22.

The shaft 53 is rotated counter-clockwise by means of the piston rod 57 which is elevated by the operation of the cylinder 56, whereby the tongues 52 are projected upwardly through the openings 51. These tongues prevent the sheets *a* on the suction box from passing through by an error.

In the above mentioned phase, the counter 16 has already started to count the number of a new batch of sheets in cut sheets and after a predetermined number of sheets is cut, the second signal is generated to actuate the cylinder 28 to elevate the piston rod 29 and as the conveying runs of the belts 22 of the conveyor D are lifted above the top walls of the suction boxes 31, the sheets *a* retained thereon are released and are again carried towards the conveyor E. At this time, the front end of the supporting plate 38 is returned to its position by the action of the cylinder 42, while the tongues 52 are lowered through the openings 51.

These operations are repeated and successive batches consising of a prescribed number of sheets are obtained.

The present invention has no conventional disadvantages in that no error occurs in the number of the sheets constituting a batch, since a sheet can be positively retained on the suction box and since this arrangement offers no resistance to the belts of the conveyor, the position of sheets relative to the suction boxes remains constant.

What I claim is:

1. A device for creating a space in an overlapping stream of sheets which are cut from a web to a fixed length which web is fed to the device by a conveying means at a fixed feeding rate, comprising:

a counting means for counting the sheets which are cut from the web to a fixed length;

a first conveyor for receiving the cut sheets;

a second conveyor having a plurality of parallel conveying runs positioned to receive the sheets from the first conveyor and operating at a slower rate of speed than the feeding speed of the web to cause the cut sheets to be formed into an overlapping stream;

a suction means positioned between and normally below the conveying runs of the second conveyor;

a plurality of holding tongues positioned between and normally below the conveying runs of the second conveyor and positioned between said suction means and said first conveyor, said second conveyor being adapted to move downward relative to said suction means to cause said suction means to project above the conveying runs when the counting means reaches a predetermined number, thus holding a sheet on the suction means when said counting means counts a predetermined number of the cut sheets and moving upwardly after an interval of time causing said suction means to sink below the conveying runs of the second conveyor and releasing the sheet halted on the suction means and all sheets which were received thereon during the interval of time, said holding tongues being adapted to project above and retreat below the conveying runs of said second conveyor synchronously with the downward and upward movement of said second conveyor for engaging the front edge of the sheet halted by the suction means so as to prevent the sheet from passing through the suction means.

* * * * *